(12) United States Patent
Godin et al.

(10) Patent No.: US 12,526,727 B2
(45) Date of Patent: Jan. 13, 2026

(54) NETWORK MEASUREMENTS

(71) Applicant: Nokia Technologies Oy, Espoo (FI)

(72) Inventors: Philippe Godin, Versailles (FR); Anna Pantelidou, Massy (FR); Hakon Helmers, Sceaux (FR)

(73) Assignee: Nokia Technologies Oy, Espoo (FI)

( * ) Notice: Subject to any disclaimer, the term of this patent is extended or adjusted under 35 U.S.C. 154(b) by 413 days.

(21) Appl. No.: 17/763,289

(22) PCT Filed: Sep. 24, 2020

(86) PCT No.: PCT/EP2020/076689
§ 371 (c)(1),
(2) Date: Mar. 24, 2022

(87) PCT Pub. No.: WO2021/063790
PCT Pub. Date: Apr. 8, 2021

(65) Prior Publication Data
US 2022/0345990 A1    Oct. 27, 2022

(30) Foreign Application Priority Data

Oct. 4, 2019 (GB) ..................... 1914398

(51) Int. Cl.
*H04W 48/02* (2009.01)
*H04W 24/10* (2009.01)
*H04W 84/04* (2009.01)

(52) U.S. Cl.
CPC .......... *H04W 48/02* (2013.01); *H04W 24/10* (2013.01); *H04W 84/042* (2013.01)

(58) Field of Classification Search
CPC ..... H04W 48/12; H04W 36/08; H04W 48/10; H04W 84/045; H04W 84/042; H04W 76/27; H04W 48/08
See application file for complete search history.

(56) References Cited

U.S. PATENT DOCUMENTS

2012/0039302 A1*  2/2012  Chun ............... H04W 36/0027
                                                          370/331
2015/0045014 A1*  2/2015  Bodog .................. H04W 24/10
                                                          455/422.1
(Continued)

FOREIGN PATENT DOCUMENTS

EP            2360962 A2    8/2011
WO      2021/052719 A1    3/2021
WO      2021/063680 A1    4/2021

OTHER PUBLICATIONS

"New Work Item Proposal on Private Network Support for NG-RAN", 3GPP TSG RAN Meeting #83, RP-190729, Agenda: 9.1.3, China Telecom, Mar. 18-21, 2019, 5 pages.
(Continued)

*Primary Examiner* — Yee F Lam
(74) *Attorney, Agent, or Firm* — Nokia Technologies Oy

(57) ABSTRACT

An apparatus, method and compute program is described comprising receiving (at a network node) one or more network node configuration messages from a control module, wherein each network node configuration message relates to network measurement of one or more restricted access resources for one or more groups of users of a public land mobile network, wherein the one or more restricted access resources are indicated within the network node configuration messages with one or more resource indicators; and sending one or more user device configuration messages to one or more selected user devices respectively, each user device configuration message including one or more resource indicators and one or more parameters, wherein the one or more resource indicators identify the one or more restricted access resources.

18 Claims, 10 Drawing Sheets

(56) References Cited

U.S. PATENT DOCUMENTS

| | | | | |
|---|---|---|---|---|
| 2020/0221372 | A1* | 7/2020 | Shih | H04W 76/25 |
| 2020/0329422 | A1* | 10/2020 | Sirotkin | H04W 48/18 |
| 2020/0329524 | A1* | 10/2020 | Park | H04W 72/23 |
| 2021/0092710 | A1* | 3/2021 | Tiwari | H04W 48/16 |
| 2021/0099924 | A1* | 4/2021 | Shih | H04W 36/0061 |
| 2021/0100062 | A1* | 4/2021 | Joseph | H04W 76/27 |
| 2022/0007274 | A1* | 1/2022 | Jin | H04W 48/10 |
| 2022/0174464 | A1* | 6/2022 | Ohlsson | H04W 76/50 |

OTHER PUBLICATIONS

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.7.0, Sep. 2019, pp. 1-962.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.

"3rd Generation Partnership Project; Technical Specification Group Services and System Aspects; Telecommunication management; Subscriber and equipment trace; Trace control and configuration management (Release 15)", 3GPP TS 32.422, V15.2.0, Jun. 2019, pp. 1-189.

Search Report received for corresponding United Kingdom Patent Application No. 1914398.1, dated Jun. 15, 2020, 4 pages.

"MDT Measurement quantities and UE impact", 3GPP TSG-RAN WG2#105, R2-1900311, Agenda: 11.12.2, vivo, Feb. 25-Mar. 1, 2019, 3 pages.

"MDT Based On User Differentiation", 3GPP TSG-RAN WG2 #106, R2-1904007, Agenda: 11.12.2, May 13-17, 2019, 5 pages.

International Search Report and Written Opinion received for corresponding Patent Cooperation Treaty Application No. PCT/EP2020/076689, dated Dec. 9, 2020, 13 pages.

Office action received for corresponding European Patent Application No. 20775013.4, dated Oct. 28, 2025, 3 pages.

* cited by examiner

NETWORK MEASUREMENTS

RELATED APPLICATION

This application claims priority to PCT Application No. PCT/EP2020/076689, filed on Sep. 24, 2020, which claims priority to GB Application No. 1914398.1 filed on Oct. 4, 2019, each of which is incorporated herein by reference in its entirety.

FIELD

The present specification relates to network measurements.

BACKGROUND

Network performance may be measured using one or more devices in the network. Minimization of Drive Test (MDT) measurements may allow collecting network performance data from any user devices present in the relevant network or network area. There remains scope of further developments in this field.

SUMMARY

In a first aspect, this specification describes an apparatus (e.g. a network node) comprising: at least one processor; and at least one memory including computer program code, the at least one memory and the computer program code configured to, with the at least one processor, cause the apparatus to perform at least the following: receiving, at a network node (e.g. an NG-RAN node), one or more network node configuration messages from a control module (e.g. an NG-RAN OAM module or a 5G core network module), wherein each network node configuration message relates to network measurement of one or more restricted access resources (RARs, such as "subsets"—these include CAGs, network slices, etc.) for one or more groups of users of a public land mobile network, wherein the one or more restricted access resources are indicated within the network node configuration messages (e.g. within each network node configuration message) with one or more resource indicators (e.g. CAG1, CAG2, network slice A etc.); and sending one or more user device configuration messages to one or more or more selected user devices respectively, each user device configuration message including one or more resource indicators and one or more parameters, wherein the one or more resource indicators identify the one or more restricted access resources.

Some embodiments comprise: selecting said one or more selected user devices, wherein said selected user devices are able to determine (e.g. measure) one or more network measurement data for the one or more restricted access resources.

Some embodiments comprise: receiving network measurement data for at least one of the one or more restricted access resources from at least one of the one or more selected user devices. Furthermore, some embodiments comprise: sending one or more measurement reports based on the network measurement data to one or more trace collection entities.

The one or more measurement reports may be combined into measurement data associated with a non-public network associated with the public land mobile network. Alternatively, or in addition, the one or more measurement reports are combined into measurement data associated with one or more slices of the public land mobile network (e.g. as defined by S-NSSAI(s)).

The network measurement may be related to minimization of drive test measurements.

The control module may comprise an NG-RAN Operation Administration and Management (OAM) module. Alternatively, or in addition, the control module is a 5G core network module.

The selecting of said one or more selected user devices (as discussed above) may be based on an identification of a particular user device within a message from a 5G core network module.

Some embodiments comprise: receiving (e.g. at a network node) one or more data availability indication messages from one or more of said selected user devices, wherein each data availability message indicates that network measurement data associated with the respective user device are available. The data availability message may also indicate the relevant restricted access resources for which the network measurement data is available.

Some embodiments comprise: sending a data request to one of said selected user devices requesting said network measurement data. The sending of the data request may be triggered by receiving a data availability indication message from the user device.

The group of users allowed to access the one or more restricted access resources may belong to one tenant associated with the public land mobile network. Alternatively, or in addition, the group of users allowed to access the restricted access resource correspond to one or more Closed Access Group(s) of a non-public network associated to a public land mobile network, and the resource indicator(s) correspond to one or more CAG Identifier(s).

In a second aspect, this specification describes an apparatus (such as a user device or a user equipment) comprising: at least one processor; and at least one memory including computer program code, the at least one memory and the computer program code configured to, with the at least one processor, cause the apparatus to perform at least the following: receiving, at a user device, one or more user device configuration messages from a network node, wherein each user device configuration message includes one or more resource indicators and one or more parameters to be measured, wherein the one or more resource indicators identify one or more restricted access resources for one or more groups of users of a public land mobile network; and determining (e.g. measuring) network measurement data related to the one or more network parameters of the restricted access resource corresponding to the resource indicator when the user device has access to the restricted access resource and/or is able to determine network measurement data for the restricted access resource.

Some embodiments comprise: sending a data availability indication message to a receiving network node indicating that network measurement data associated with the respective restricted access resource are available. The receiving network node may be the same network node that sent the user device configuration messages, but this is not essential to all embodiments. Thus, the receiving network node may, in some circumstances, be different to the network node that sent the user device configuration messages.

Some embodiments comprise: sending the determined (e.g. measured) network measurement data to a/the receiving network node. The determined network measurement data may be sent in response to a request from the network node, which request may follow an indication of data availability from the user device to the network node.

The group of users allowed to access the one or more restricted access resources may belong to one tenant associated with the public land mobile network. Alternatively, or in addition, the group of users allowed to access the restricted access resource correspond to one or more Closed Access Group(s) of a non-public network associated to a public land mobile network, and the resource indicator(s) correspond to one or more CAG Identifier(s).

In a third aspect, this specification describes a method comprising: receiving, at a network node (e.g. an NG-RAN node), one or more network node configuration messages from a control module (e.g. an NG-RAN OAM module or a 5G core network module), wherein each network node configuration message relates to network measurement of one or more restricted access resources (RARs) for one or more groups of users of a public land mobile network, wherein the one or more restricted access resources are indicated within the network node configuration messages with one or more resource indicators; and sending one or more user device configuration messages to one or more selected user devices respectively, each user device configuration message including one or more resource indicators and one or more parameters, wherein the one or more resource indicators identify the one or more restricted access resources.

Some embodiments comprise: selecting said one or more selected user devices, wherein said selected user devices are able to determine (e.g. measure) one or more network measurement data for the one or more restricted access resources.

Some embodiments comprise: receiving network measurement data for at least one of the one or more restricted access resources from at least one of the one or more selected user devices. Furthermore, some embodiments comprise: sending one or more measurement reports based on the network measurement data to one or more trace collection entities.

The selecting of said one or more selected user devices (as discussed above) may be based on an identification of a particular user device within a message from a 5G core network module.

Some embodiments comprise: receiving (e.g. at a network node) one or more data availability indication messages from one or more of said selected user devices, wherein each data availability message indicates that network measurement data associated with the respective user device are available. The data availability message may also indicate the relevant restricted access resources.

Some embodiments comprise: sending a data request to one of said selected user devices requesting said network measurement data. The sending of the data request may be triggered by receiving a data availability indication message from the user device.

In a fourth aspect, this specification describes a method comprising: receiving, at a user device, one or more user device configuration messages from a network node, wherein each user device configuration message includes one or more resource indicators and one or more parameters to be measured, wherein the one or more resource indicators identify one or more restricted access resources for one or more groups of users of a public land mobile network; and determining (e.g. measuring) network measurement data related to the one or more network parameters of the restricted access resource corresponding to the resource indicator when the user device has access to the restricted access resource and/or is able to determine network measurement data for the restricted access resource.

Some embodiments comprise: sending a data availability indication message to a receiving network node indicating that network measurement data associated with the respective restricted access resource are available. The receiving network node may or may not be the same network node that sent the instructions, but this is not essential to all embodiments.

Some embodiments comprise: sending the determined (e.g. measured) network measurement data to a/the receiving network node. The determined network measurement data may be sent in response to a request from the network node, which request may follow an indication of data availability from the user device to the network node.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer readable medium comprising program instructions stored thereon for performing at least the following: receiving, at a network node (e.g. an NG-RAN node), one or more network node configuration messages from a control module (e.g. an NG-RAN OAM module), wherein each network node configuration message relates to network measurement of one or more restricted access resources (RARs) for one or more groups of users of a public land mobile network, wherein the one or more restricted access resources are indicated within the network node configuration messages with one or more resource indicators; and sending one or more user device configuration messages to one or more selected user devices respectively, each user device configuration message including one or more resource indicators and one or more parameters, wherein the one or more resource indicators identify the one or more restricted access resources.

In an eighth aspect, this specification describes a computer readable medium comprising program instructions stored thereon for performing at least the following: receiving, at a user device, one or more user device configuration messages from a network node, wherein each user device configuration message includes one or more resource indicators and one or more parameters to be measured, wherein the one or more resource indicators identify one or more restricted access resources for one or more groups of users of a public land mobile network; and determining (e.g. measuring) network measurement data related to the one or more network parameters of the restricted access resource corresponding to the resource indicator when the user device has access to the restricted access resource and/or is able to determine network measurement data for the restricted access resource.

In a ninth aspect, this specification describes a computer program comprising instructions for causing an apparatus to perform at least the following: receiving, at a network node (e.g. an NG-RAN node), one or more network node configuration messages from a control module (e.g. an NG-RAN OAM module), wherein each network node configuration message relates to network measurement of one or more restricted access resources (RARs) for one or more groups of users of a public land mobile network, wherein the one or more restricted access resources are indicated within the network node configuration messages with one or more resource indicators; and sending one or more user device configuration messages to one or more selected user devices respectively, each user device configuration message including one or more resource indicators and one or more parameters, wherein the one or more resource indicator identify one or more restricted access resources.

In a tenth aspect, this specification describes a computer program comprising instructions for causing an apparatus to perform at least the following: receiving, at a user device, one or more user device configuration messages from a network node, wherein each user device configuration message includes one or more resource indicators and one or more parameters to be measured, wherein the one or more resource indicators identify one or more restricted access resources for one or more groups of users of a public land mobile network; and determining (e.g. measuring) network measurement data related to the one or more network parameters of the restricted access resource corresponding to the resource indicator when the user device has access to the restricted access resource and/or is able to determine network measurement data for the restricted access resource.

In an eleventh aspect, this specification describes an apparatus comprising: means for receiving, at a network node (e.g. an NG-RAN node), one or more network node configuration messages from a control module (e.g. an NG-RAN OAM module), wherein each network node configuration message relates to network measurement of one or more restricted access resources (RARs) for one or more groups of users of a public land mobile network, wherein the one or more restricted access resources are indicated within the network node configuration messages with one or more resource indicators; and means for sending one or more user device configuration messages to one or more selected user devices respectively, each user device configuration message including one or more resource indicators and one or more parameters, wherein the one or more resource indicator identify one or more restricted access resources.

In a twelfth aspect, this specification describes an apparatus comprising: means for receiving, at a user device, one or more user device configuration messages from a network node, wherein each user device configuration message includes one or more resource indicators and one or more parameters to be measured, wherein the one or more resource indicators identify one or more restricted access resources for one or more groups of users of a public land mobile network; and means for determining (e.g. measuring) network measurement data related to the one or more network parameters of the restricted access resource corresponding to the resource indicator when the user device has access to the restricted access resource and/or is able to determine network measurement data for the restricted access resource.

In a thirteenth aspect, this specification describes a network node (e.g. an NG-RAN node) comprising: an input for receiving one or more network node configuration messages from a control module (e.g. an NG-RAN OAM module), wherein each network node configuration message relates to network measurement of one or more restricted access resources (RARs) for one or more groups of users of a public land mobile network, wherein the one or more restricted access resources are indicated within the network node configuration messages with one or more resource indicators; and an output for sending one or more user device configuration messages to one or more selected user devices respectively, each user device configuration message including one or more resource indicators and one or more parameters, wherein the one or more resource indicator identify one or more restricted access resources.

In a fourteenth aspect, this specification describes a user device (e.g. a user equipment) comprising: an input for receiving one or more user device configuration messages from a network node, wherein each user device configuration message includes one or more resource indicators and one or more parameters to be measured, wherein the one or more resource indicators identify one or more restricted access resources for one or more groups of users of a public land mobile network; and a processor for determining (e.g. measuring) network measurement data related to the one or more network parameters of the restricted access resource corresponding to the resource indicator when the user device has access to the restricted access resource and/or is able to determine network measurement data for the restricted access resource.

BRIEF DESCRIPTION OF THE DRAWINGS

Example embodiments will now be described, by way of non-limiting examples, with reference to the following schematic drawings, in which.

DETAILED DESCRIPTION

Figure 1:
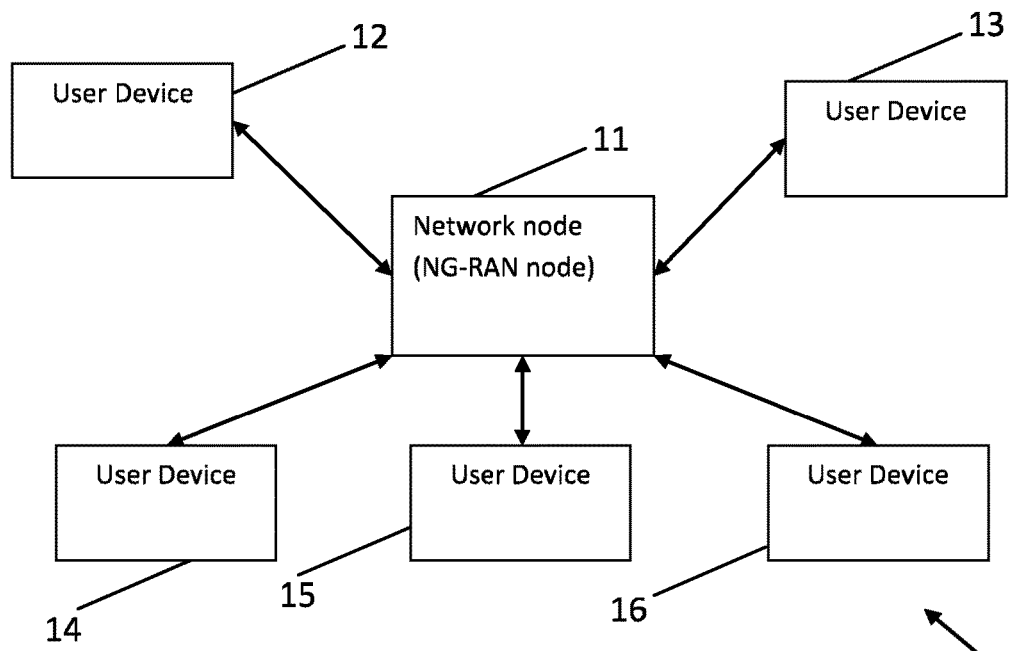
FIGS. 1 and 2 are block diagrams of example systems.

The scope of protection sought for various example embodiments of the invention is set out by the independent claims. The example embodiments and features, if any, described in the specification that do not fall under the scope of the independent claims are to be interpreted as examples useful for understanding various example embodiments of the invention.

In the description and drawings, like reference numerals refer to like elements throughout.

FIG. 1 is a block diagram of an example system, indicated generally by the reference numeral 10. The system 10 comprises a network node 11 (such as a 5G Radio Access Network (NG-RAN) node or some other network node or base station) and a plurality of user devices 12 to 16 (such as user equipment (UE)). One or more of the user devices 12 to 16 may be in two-way communication with the network node 11.

Drive tests may be carried out for the purpose of verification of network performance (including radio coverage, e.g. UE measurement of received cell reference signal power and interference, etc.) or user device performance (e.g. call drop, throughput, packet delay, etc.) in a plurality of geographical areas by driving testing vehicles around the areas.

In order to reduce the cost and resources required for such drive tests, network nodes may use minimization of drive tests (MDT) for collecting information regarding network performance. In MDT, drive tests are minimized by allowing user devices that are already located in an area to collect network performance measurements, and report the measurements to the network node, such that the network node may determine network performance for the plurality of areas based on network performance measurements received from a plurality of user devices that may already be located in the areas. For example, with reference to system 10, a first plurality of user devices (e.g. including user devices 12 and 13) may be located within a first area, and a second plurality of user devices (e.g. including user devices 14, 15 and 16) may be located in a second area. As such, the network node 11 may configure the first plurality of user devices to measure network performance of one or more networks in the first area, and may configure the second plurality of user devices to measure network performance of one or more networks in the second area.

MDT (Minimization of Drive Tests) features may be used by operators for feedback on the coverage on a particular area of their network (Management-based MDT) or feedback on the radio conditions experienced by some specific UE(s) in a given coverage area of the PLMN (signalling based MDT). Two modes of MDT measurements are: Logged MDT and Immediate MDT.

A user equipment (UE) configured to perform Logged MDT may indicate data availability to the network by sending an RRC message. For New Radio (NR), this message can be RRCSetupComplete (similar to RRCConnectionSetupComplete in LTE), RRCReestablishmentComplete (similar to RRCConnectionReestablishmentComplete in LTE) or RRCResumeComplete message. The network can retrieve the data by sending an appropriate request.

Immediate MDT may also involve configuration at the UE using existing RRC messages. Immediate MDT additionally allows detailed location information reporting (e.g., GNSS) if this is available at the UE.

Logged MDT and Immediate MDT may further be divided into two categories, depending on the way MDT is initiated. A first category may comprise signalling based MDT, and a second category may comprise a management based (e.g. area based) MDT. The signalling based MDT may be initiated towards a specific UE by the Signalling Trace Activation messages from the core network. Management based MDT is initiated by the Management-based Trace function from OAM towards a plurality of UEs in a specific area.

Figure 2:
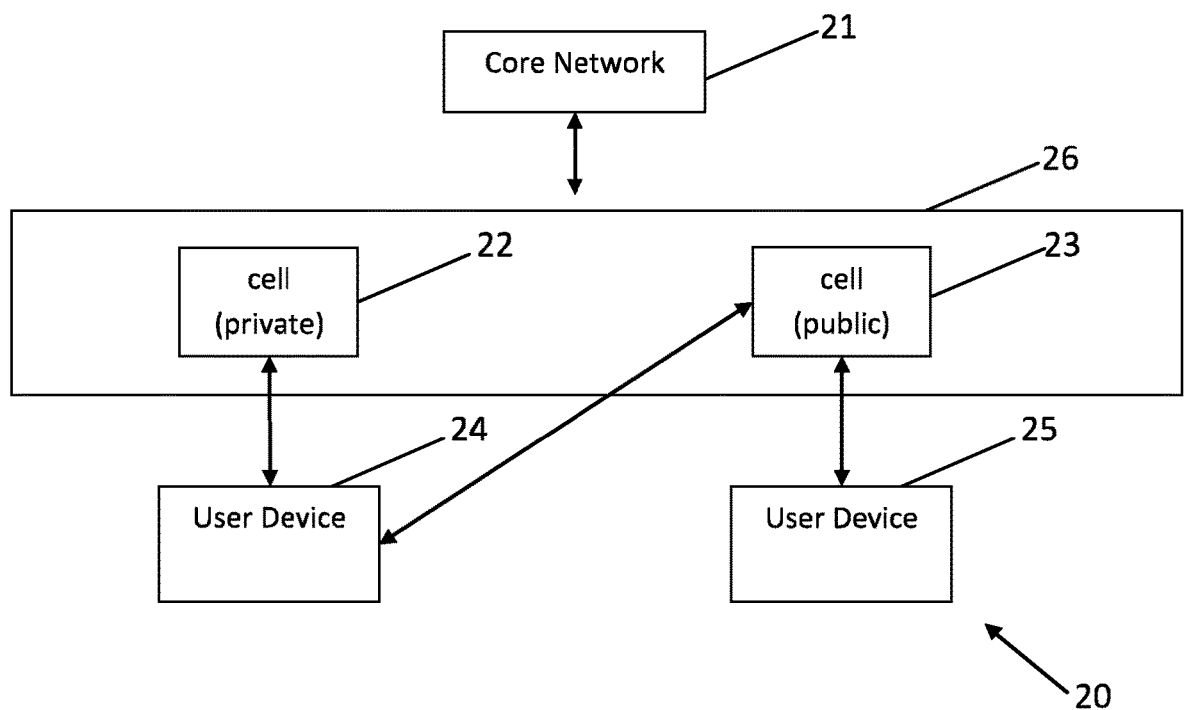

FIG. 2 is a block diagram of an example system, indicated generally by the reference numeral 20. The system 20 comprises a core network 21, a private cell 22, a public cell 23, and user devices 24 and 25. In the example system 20, the private cell 22 and the public cell 23 are provided by the NG-RAN node 26. The private cell 22 may be part of a private network (e.g. a closed access group (CAG)), and the public cell 23 may be part of a public network. As shown in the system 20, the user device 24 may have access to both the private cell 22 and the public cell 23, such that the user device 24 may have access to the private network hosted at the gNB 26. As the public cell 23 is a part of a public network, a plurality of user devices, such as both the user device 24 and the user device 25 may have access to the public cell 23. However, the user device 25 may not have access (e.g. may not have permission to access) to the private cell 22. As such, the user device 24 may have the capability of connecting to any one of the cells 22 and 23 (e.g. based on location of the user device). Note that this description is by way of example only and variants are possible; for example gNB 26 may comprise a multitude of private cells 22 and public cells 23.

A user equipment (UE), such as the user device 24, may be associated with one or more closed access groups, identified with one or more Closed Access Group Identifiers (CAG-ID) identifying the closed access groups to which the UE may belong. A CAG cell in a NG-RAN broadcasts a CAG-ID, and such cell represents a network resource to which access is restricted and only allowed for UEs belonging to the closed access group (Restricted Access Resource, also termed as RAR for simplicity) identified by the CAG-ID. The CAGs that the UE may be associated with may be indicated by "UE allowed CAG IDs". A UE may be authorized to access a CAG cell of a public land mobile network (PLMN) if at least one of the UE allowed CAG IDs of the UE is supported in the cell. In order to enable the NG-RAN node to control whether a UE is allowed to access a cell in connected or idle mode mobility, or to enable the NG-RAN node to select suitable cells for the UE in connected or idle mode mobility, the NG-RAN node may be aware of a list of UE Allowed CAG IDs. Thus, an access and mobility management function (AMF) may provide the list of UE Allowed CAG IDs to the NG-RAN node which is sent in NG Application Protocol (NGAP) messages creating a context for the UE in the NG-RAN node e.g. for Initial Context Setup.

Figure 3:
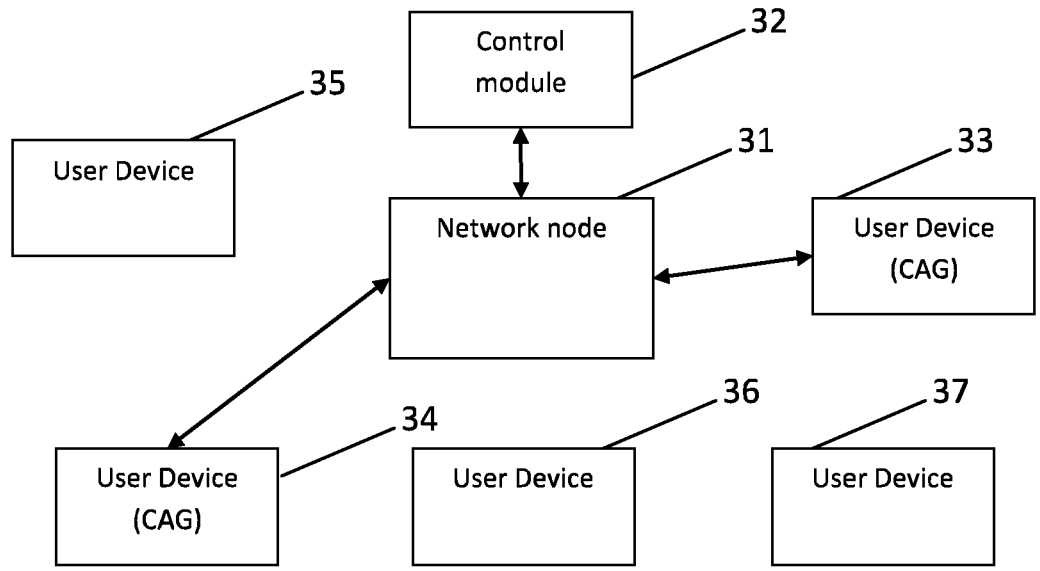
FIGS. 3 and 4 are block diagrams of systems in accordance with example embodiments.

FIG. 3 is a block diagram of a system, indicated generally by the reference numeral 30, in accordance with an example embodiment. The system 30 comprises a network node 31, control module 32, and a plurality of user devices 33 to 37. The user devices 33 and 34 have access to a first private network (whilst the user devices 35 to 37 do not have access to that first private network).

Some example embodiments described herein disclose methods and systems for determining network measurements (e.g. MDT measurements) for one or more private networks (e.g. CAG). As, such, the network node 31 may receive MDT configurations from the control module 32 for configuring one or more user devices to determine network measurements (e.g. MDT measurements) of the first private network. For example, since the user devices 33 and 34 have access to the first private network, the user devices 33 and 34 may be selected by the network node 31, such that the user devices 33 and 34 may determine MDT network measurements related to the first private network. The user devices 33 and 34 may be in two-way communication with the network node 31 for configuration of the user devices 33 and 34 for the MDT measurements.

For example, the closed access group may correspond to a tenant (e.g. an enterprise), such that only employees of that enterprise may have access to certain cells. This tenant may want to collect information only related to the area/cells from which its users can get access. An MDT mechanism may enable triggering MDT to report for a given PLMN for which user consent has been granted, and/or for that PLMN for a given area (full PLMN, list of TAIs, list of cells). Some of the example embodiments provide methods and systems for limiting the MDT measurements as per owner of private networks or owner of Closed Access groups (e.g. an enterprise). Alternatively, or in addition, the network resources of a PLMN may be divided into several network slices. One network slice (identified by a S-NSSAI—Single Network Slice Assistance Information) can again correspond to one enterprise and its employees. That enterprise may request an operator hosting the PLMN to verify network performance of user devices of their employees in relation to the network slice, which is an alternative way of providing a restricted access resource.

Figure 4:
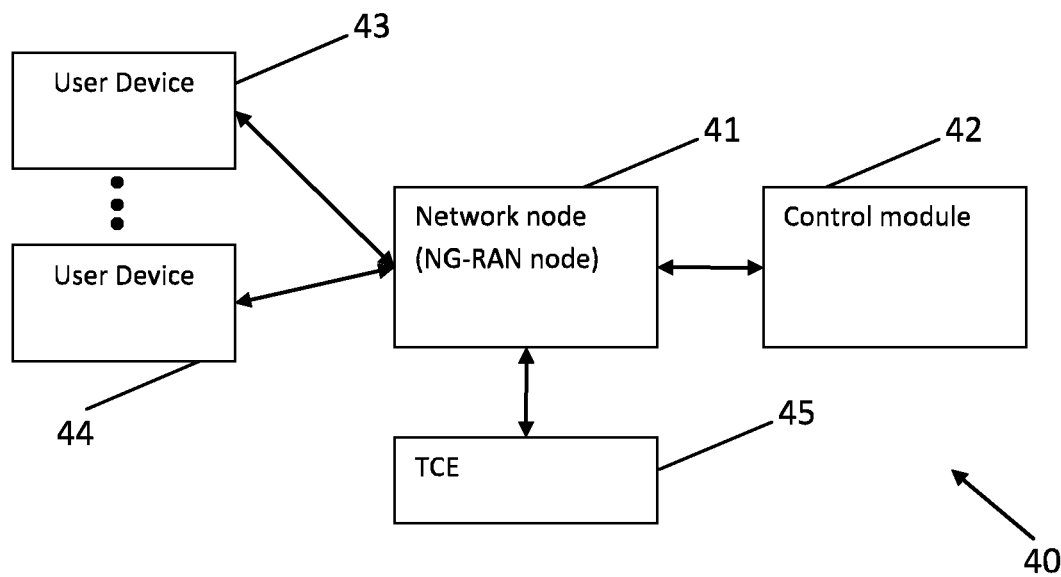

FIG. 4 is a block diagram of a system, indicated generally by the reference numeral 40, in accordance with an example embodiment. System 40 comprises a network node 41, a control module 42, a plurality of user devices 43 and 44, and a trace collection entity (TCE) 45. As described in detail below, the network node 41 may collect network measurement information (such as MDT data) from selected ones of the user devices 43 and 44, for example under the control of the control module 42. The collected MDT data may be provided to the TCE 45, or to some other location. In some embodiments, the control module 42 and the TCE 45 are provided at different locations, although this is not essential to all embodiments.

Figure 5:
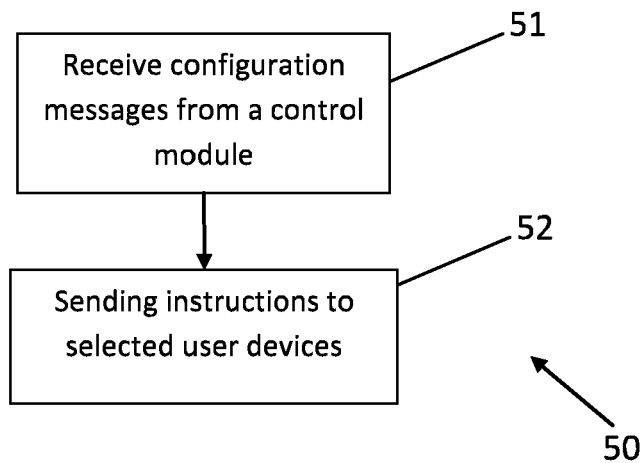
FIGS. 5 and 6 are flow charts showing algorithms in accordance with example embodiments.

FIG. 5 is a flow chart, indicated generally by the reference numeral 50, in accordance with an example embodiment.

The procedure 50 starts at operation 51 where one or more network node configuration messages are received at a network node (such as the network nodes 31 or 41 described above) from a control module (such as the control module 32 or 42). Each network node configuration message relates to network measurements for one or more restricted access resource (e.g. closed access groups or network slices) within a public land mobile network, wherein each of the one or more restricted access resource are indicated within the network node configuration messages with a respective restricted access resource indicator. (Restricted access resources are sometimes referred to as "subsets".)

At operation 52, instructions are sent to selected user devices. For example, one or more user device configuration messages may be sent to one or more selected user devices respectively, wherein each user device configuration message identifies one or more relevant restricted access resources (or subsets) and one or more parameters. As described in detail below, the one or more selected user devices may comprise user devices that are able to determine network measurement data for the respective restricted access resources.

Figure 6:
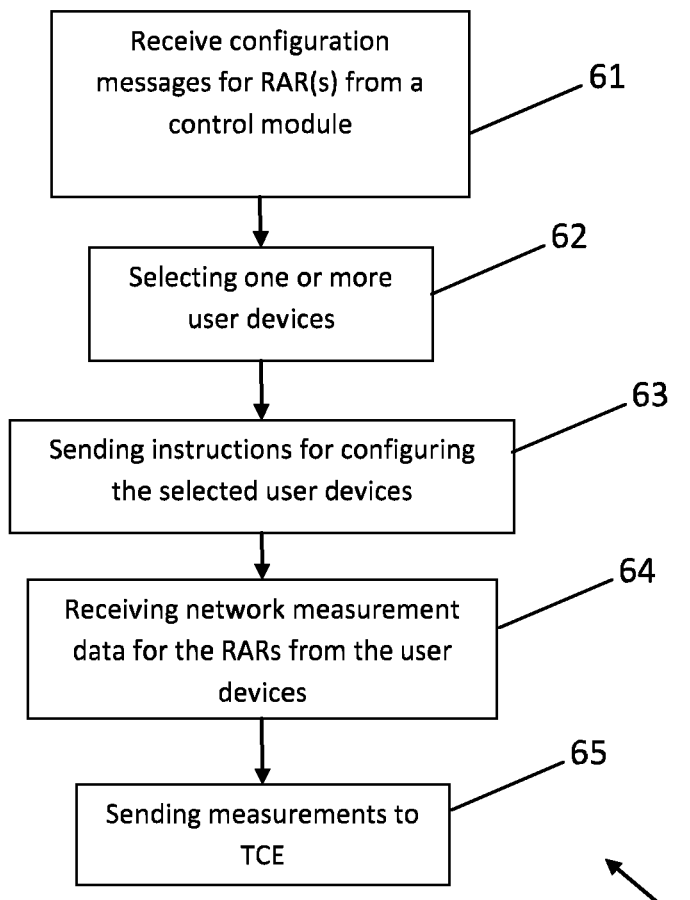

FIG. 6 is a flow chart, indicated generally by the reference numeral 60, in accordance with an example embodiment.

The procedure 60 starts at operation 61 where (similar to the operation 51), one or more network node configuration messages are received at a network node (such as the network nodes 31 or 41 described above) from a control module (such as the control module 32 or 42). Each network node configuration message relates to network measurements for one or more restricted access resource (e.g. closed access groups or network slices) within a public land mobile network, wherein each of the one or more restricted access resources are indicated within the network node configuration messages with a respective restricted access resource indicator.

At operation 62, one or more user devices are selected, wherein said selected user devices are able to determine network measurement data for the respective restricted access resources.

At operation 63 (similar to operation 52), instructions are sent to selected user devices (e.g. the user devices selected in operation 62). For example, one or more user device configuration messages may be sent to one or more selected user devices respectively, wherein each user device MDT configuration message identifies one or more relevant restricted access resources and one or more parameters.

At operation 64, network measurement data are received for at least one of the one or more restricted access resources from at least one of the selected user devices.

At operation 65, one or more measurements (e.g. measurement reports, or measurement records) are sent to one or more trace collection entities (as discussed further below).

Figure 7:
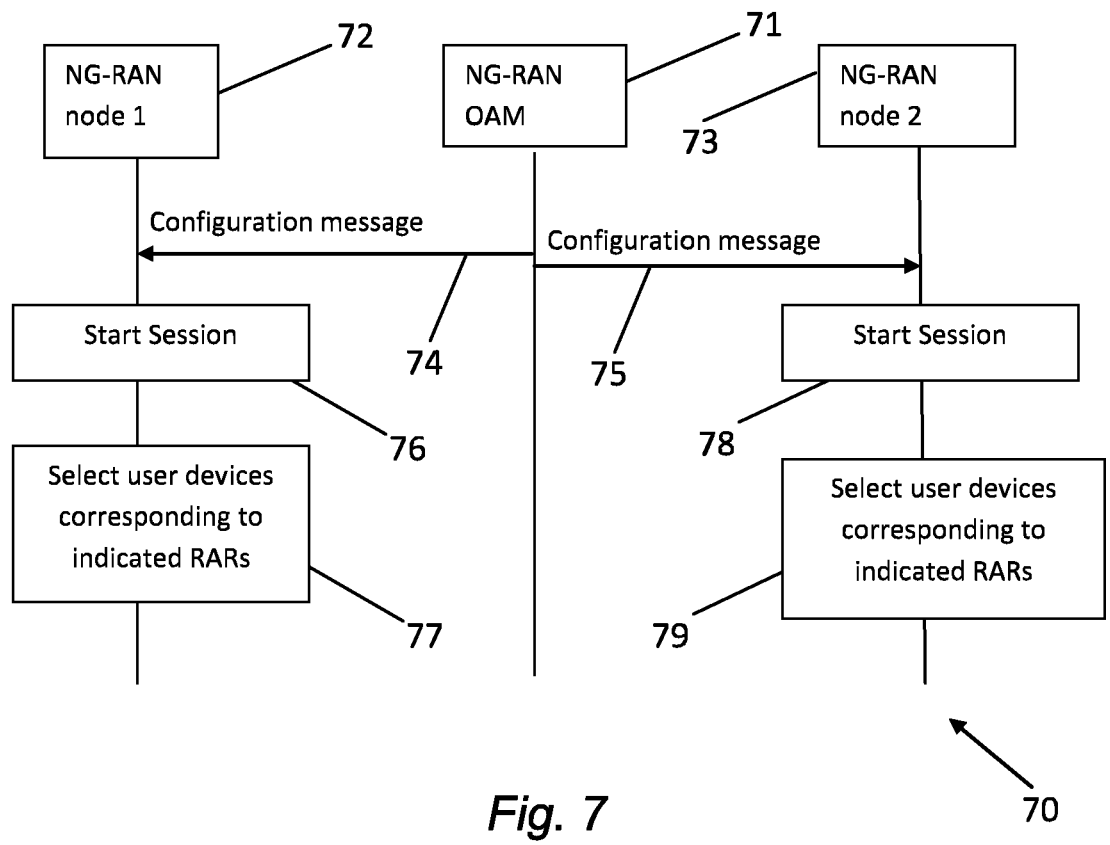
FIG. 7 shows a message sequence in accordance with an example embodiment.

FIG. 7 shows a message sequence, indicated generally by the reference numeral 70, in accordance with an example embodiment. The message sequence 70 may, for example, be used to implement the procedures 50 and 60 described above.

The message sequence 70 shows messages between an NG-RAN OAM (operation administration and management) server 71, a first NG-RAN node 72 and a second NG-RAN node 73. Viewing FIG. 7 in conjunction with FIG. 4, the NG-RAN OAM server 71 is an example of the control module 42 and the NG-RAN nodes 72 and 73 are examples of two instances of the network node 41.

As shown in the message sequence 70, the NG-RAN OAM server 71 provides MDT configuration messages 74 and 75 to the first NG-RAN nodes 72 and 73 respectively. In this way, the NG-RAN OAM server 71 can be used to configure NG-RAN nodes 72 and 73, 30 for example for MDT reports, including one or more sets of MDT configuration parameters. A configuration message can be a Trace Session Activation Request message with an indication that the session is for MDT. (Although two network nodes are shown in FIG. 7, the principles described herein apply to embodiments having more (or indeed fewer) network nodes.)

For example, the configuration message 74 may comprise a first restricted access resource (or subset) indicator with a first set of parameters (e.g. (CAGID1, parameters1)) and a second restricted access resource (or subset) indicator with a second set of parameters (e.g. (CAGID2, parameters2)). As such, UEs, corresponding to the first restricted access resource indicator, are configured with the first set of parameters and UEs, corresponding to the second restricted access resource indicator, are configured with the second set of parameters. The configuration message 75 may be similarly configured.

Each set of MDT configuration parameters may be associated with one or more CAG IDs for which UE reporting may be expected. For example, for a given CAG ID, Bluetooth and/or WLAN measurements can be configured to be collected by a UE in Logged MDT mode, while for a different CAG ID those optional fields could be omitted from the configuration. Additionally, the values of configuration parameters of Immediate or Logged MDT (as described further herein) can be set on a per CAG ID basis. For example, in case of Logged MDT such configuration parameters may comprise list of measurements, area scope (PLMN, List TAIs, List of cells), periodicity of reporting, expiration timer, log duration, etc. Thus, there can be different parameters per CAG ID. For example, CAG ID1 may have different triggers of logging events or different logging durations in case of Logged MDT than a different CAG ID. Many variants may be implemented in this way.

A session 76 (e.g. a trace session) is started at the first NG-RAN node 72, and that node selects (at operation 77) appropriate UEs for configuring MDT requests (thereby implementing operation 62 of the procedure 60). Similarly, a session 78 (e.g. a trace session) is started at the second NG-RAN node 73 and that node selects appropriate UEs for configuring MDT requests.

The set of selected UEs depends on the CAG IDs configured by the NG-RAN OAM server 71 and also by the CAG ID(s) allowed at a given UE. Namely, the relevant NG-RAN node may select UEs for which the serving CAG ID is part of the CAG IDs configured by NG-RAN OAM server 71 with an MDT configuration, or for which there is a match between the UE Allowed CAG ID list and the CAG IDs configured by NG-RAN OAM with an MDT configuration. For example, if NG-RAN OAM has configured CAG ID 1 with parameters 1 and CAG ID 2 with parameters 2 at NG-RAN node 1, NG-RAN Node 1 can select all the UEs currently served by CAG ID1. Alternatively, NG-RAN Node 1 can select all UEs allowing CAG IDs 1 and 2 (even though not both CAG IDs are served at the time of UE selection). Additionally, NG-RAN OAM can configure different parameter values to different NG-RAN nodes. MDT parameter configuration by the OAM at two different MDT area scopes can be the same for a given CAG ID. Alternatively, different MDT parameter configurations can be sent by the OAM to different MDT area scopes for the same CAG ID.

With the UEs selected, data can be collected and reported, as described in detail below.

Figure 8:
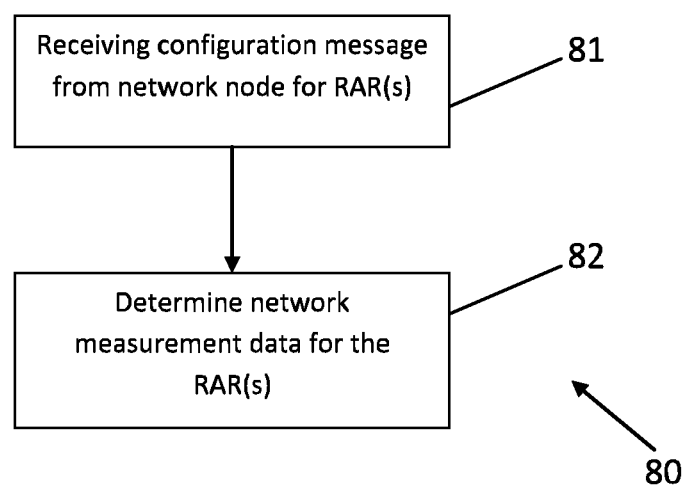
FIG. 8 is a flow chart showing an algorithm in accordance with an example embodiment.

FIG. 8 is a flow chart showing an algorithm, indicated generally by the reference numeral 80, in accordance with an example embodiment.

The algorithm 80 starts at operation 81, where a user device receives one or more user device configuration messages from a network node. Each user device configuration message may comprise configurations to configure the user device to measure one or more network parameters of one or more restricted access resources within a public land mobile network. The one or more restricted access resources may be indicated with a respective restricted access resource indicator in the respective user device configuration message. The user device configuration message may also comprise information regarding the one or more network parameters to be measured.

At operation 82, network measurement data are determined related to the one or more network parameters of at least one restricted access resource of the one or more restricted access resources when the user device has access to the at least one restricted access resource and/or is able to determine network measurement data for the at least one restricted access resource.

Figure 9:
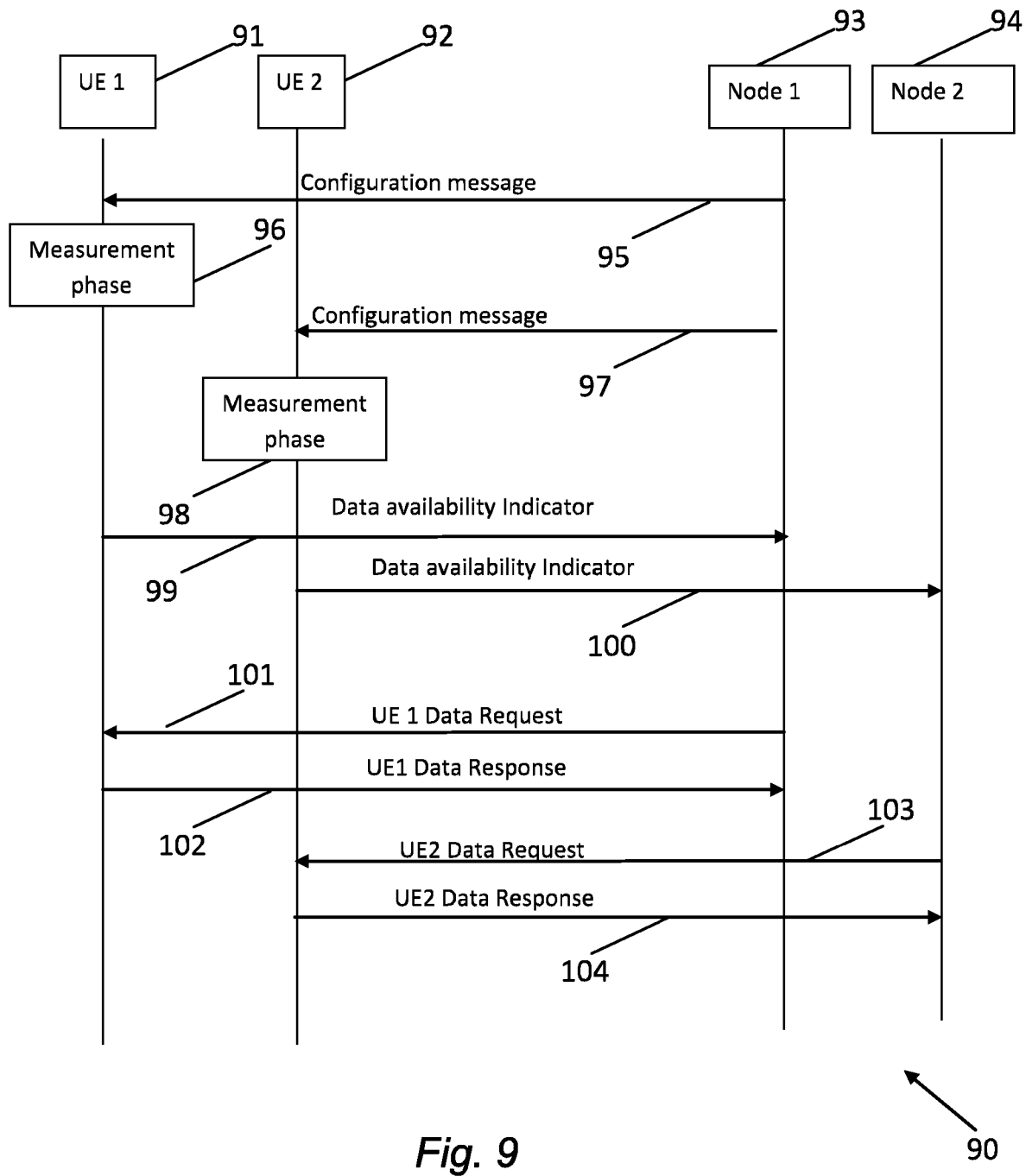
FIGS. 9 to 14 show message sequences in accordance with example embodiments.

FIG. 9 shows a message sequence, indicated generally by the reference numeral 90, in accordance with example embodiments. The message sequence 90 shows an example implementation of the algorithm 80.

The message sequence 90 shows messages between a first user equipment (UE1) 91, a second user equipment (UE2) 93, a first network node (e.g. NG-RAN node) 93 and a second network node (e.g. NG-RAN node) 94. Viewing FIG. 9 in conjunction with FIG. 4, network nodes 93 and 94 are both examples of the network node 41 and the user equipments 91 and 93 are examples of the user devices 43 to 44.

The message sequence 90 shows an example implementation of a logged MDT algorithm.

The first network node 93 sends first and second configuration messages 95 and 97 (e.g. "LoggedMeasurementConfiguration" messages) to one or more selected UE(s) (the first and second user equipment 91 and 92 respectively in this example). The configuration messages 95 and 97 include one or more sets of configuration parameters, each associated with one or more CAG IDs for which the UE should log and report measurements. This means that the values of configuration parameters in configuration messages 95 and 97 (e.g. type of measurements, area scope, periodicity of reporting, expiration timer, log duration, etc.) can be set on a per CAG ID basis. The first and second configuration messages 95 and 97 may comprise user device MDT configuration messages.

Thus, the user equipments 91 and 92 receive the first and second user device MDT configuration messages 95 and 97 respectively, wherein each user device MDT configuration message comprises configurations to configure the user device to measure one or more network parameters of one or more restricted access resource within a public land mobile network. Each of the one or more restricted access resource may be indicated with a respective restricted access resource indicator (e.g., a CAG ID) in the respective user device configuration message. The user device MDT configuration message comprises information regarding the one or more network parameters to be measured.

In response to the first configuration message 95, the first user equipment 91 enters a measurement phase 96, during which the MDT configured information is collected. The measurement phase 96 may involve determining network measurement data related to the one or more network parameters provided in the MDT configuration message 95 when the user equipment has access to the at least one restricted access resource and/or is able to determine network measurement data for the at least one restricted access resource. Similarly, in response to the second MDT configuration message 97, the second user equipment 92 enters a measurement phase 98, during which the MDT configured information is collected. The measurement phase 98 may involve determining network measurement data related to the one or more network parameters provided in the MDT configuration message 97 when the user equipment has access to the at least one restricted access resource and/or is able to determine network measurement data for the at least one restricted access resource.

The first user equipment 91 sends a first data availability indication message 99 (e.g. MDT availability indicator) to the first network node 91 indicating that network measurement data are available for the restricted access resource(s) associated with the user equipment. Thus, the UE 91 signals the availability of the configured reports.

Similarly, the second user equipment 92 sends a second data availability indication message 100 to the second network node 92. Note that the second user equipment sends the second data availability indication message 100 to a different node than the node that sent the configuration message 97. This may simply be because the relevant UE (e.g. UE 92) has moved from one cell (e.g. corresponding to network node 93) to another cell (e.g. corresponding to network node 94) during the MDT measurement phase 98.

In some example embodiments, Data Availability Indicators (similar to the messages 99 and 100) can be sent per CAG ID in case multiple MDT configurations per CAG ID are configured at a UE. Given that different configurations may have different logging duration and triggering of events data for different CAG IDs, the measurement data may become available at a UE at different times. Thus, the UE can indicate availability of measurement data for a particular CAG ID as soon as that data becomes available. The relevant network node can decide to retrieve the data either altogether when all reports are available at the UE or one/two/etc. at a time.

As shown in the message sequence 90, the first network node 93 sends a data request message 101 (e.g. UEInformationRequest IE (information element)) to the first user equipment 91 (e.g. following receipt of the data availability indication message 98) requesting the network measurement data collected in the measurement phase 96. The user equipment 91 responds by sending the determined network measurement data to the network node 93 in the data response message 102 (e.g. UEInformationResponse IE).

Similarly, the second network node 94 sends a data request message 103 (e.g. UEInformationRequest IE) to the second user equipment 92 (e.g. following receipt of the data availability indication message 100) requesting the network measurement data collected in the measurement phase 98. The user equipment 92 responds by sending the determined network measurement data to the network node 94 in data response message 104 (e.g. UEInformationResponse IE).

In this way, NG-RAN network nodes can use the UE Information Request/response procedure to pull MDT reports from the UE. The NG-RAN node may also report its own measurements related to the configured CAG IDs in same or different reports.

Figure 10:
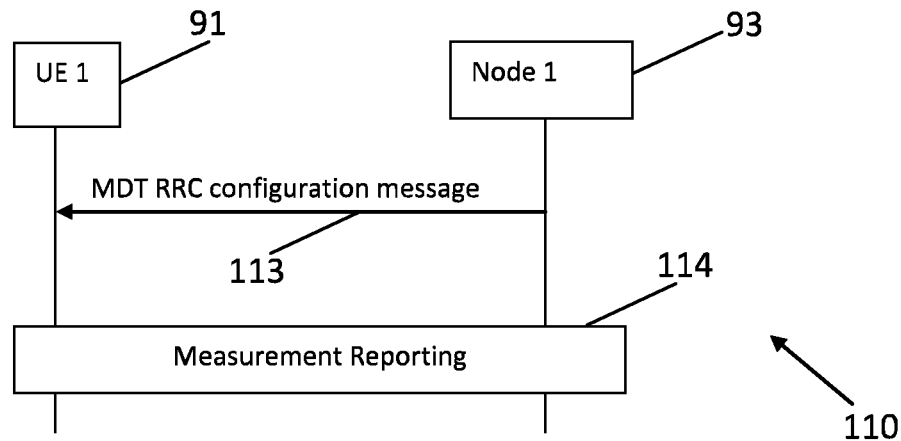

FIG. 10 shows a message sequence, indicated generally by the reference numeral 110, in accordance with example embodiments. The message sequence shows an Immediate MDT algorithm (contrasting with the Logged MDT algorithm of FIG. 9).

The message sequence 110 shows messages between the first user equipment (UE1) 91 and the first network node 93 described above.

The first network node 93 sends an MDT RRC configuration message 113 to the first user equipment 91 to configure the appropriate measurements. The user equipment 91 provides those measurements in a measurement reporting phase 114. The measurement reporting phase 114 is highly schematic and may involve a number of messages sent from the user equipment 91 to the network node 93 every time a measurement triggering event is satisfied.

Figure 11:
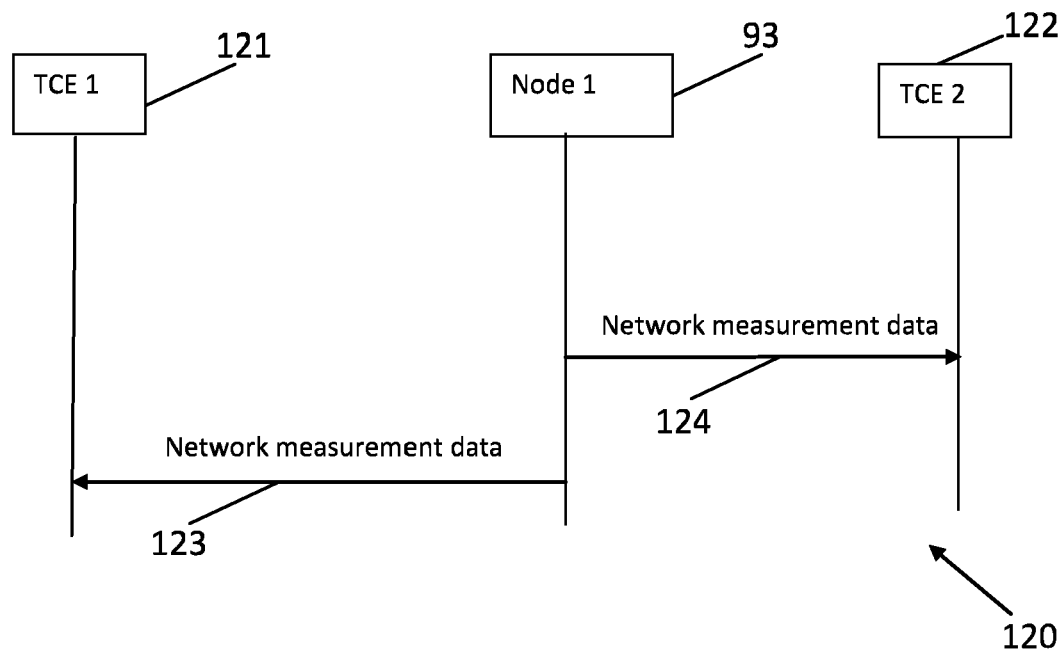

FIG. 11 shows a message sequence, indicated generally by the reference numeral 120, in accordance with example embodiments. The message sequence 120 is an example implementation of the operation 65 of the algorithm 60 described above.

The message sequence 120 shows messages between the first network node 93, a first trace collection entity (TCE) 121 and a second trace collection entity 122.

As described above, the first network node 93 obtains network measurement data (for example MDT) from one or more UEs. Some or all of the collected network measurement data are sent to the first TCE 121 in a first message 123. Similarly, some or all of the collected network measurement data are sent to the second TCE 122 in a second message 124. The messages 123 and 124 may comprise a list of restricted access resource indicators (e.g. CAG IDs) and corresponding network measurements (e.g. MDT reports). MDT measurement data can be sent to TCE through Trace Records in case records are stored at the gNB (e.g. the first network node 93), and are being forwarded to the TCE upon a trigger at the gNB. Alternatively, the gNB can use streaming methods to forward the measurements from the UEs to the TCE.

The first network node 93 reports the collected network measurement data to one or more trace collection entities (such as the TCEs 121 and/or 122) at some interval (e.g. predefined interval) or trigger conditions. The periodicity or trigger conditions to TCE may be CAG ID dependent (e.g. even if two CAG IDs have been configured together, their reporting periodicity to TCE can differ). Therefore, MDT reports can be sent to TCE when data is available for a certain CAG ID (or set of CAG IDs) and not wait until data is available for all configured CAG IDs. Thus, the CAG ID list in the messages 123 or 124 may not necessarily be the same as the one in the configuration request messages (network node configuration messages sent to the network node by the control module). Also, there may be potentially more than one TCE to send the NG-RAN reports i.e. it may be possible to dedicate some TCE(s) to some CAG ID (s) or to some S-NSSAI(s). In the message sequence 120, the network node 93 send reports (e.g. MDT reports) associated with different CAGs to different TCEs. For example, a given CAG ID can be associated with a certain TCE upon the trace initiation. If a trace is initiated to configure multiple CAG IDs then multiple TCE identities could be indicated in the Trace Session activation Request message.

Figure 12:
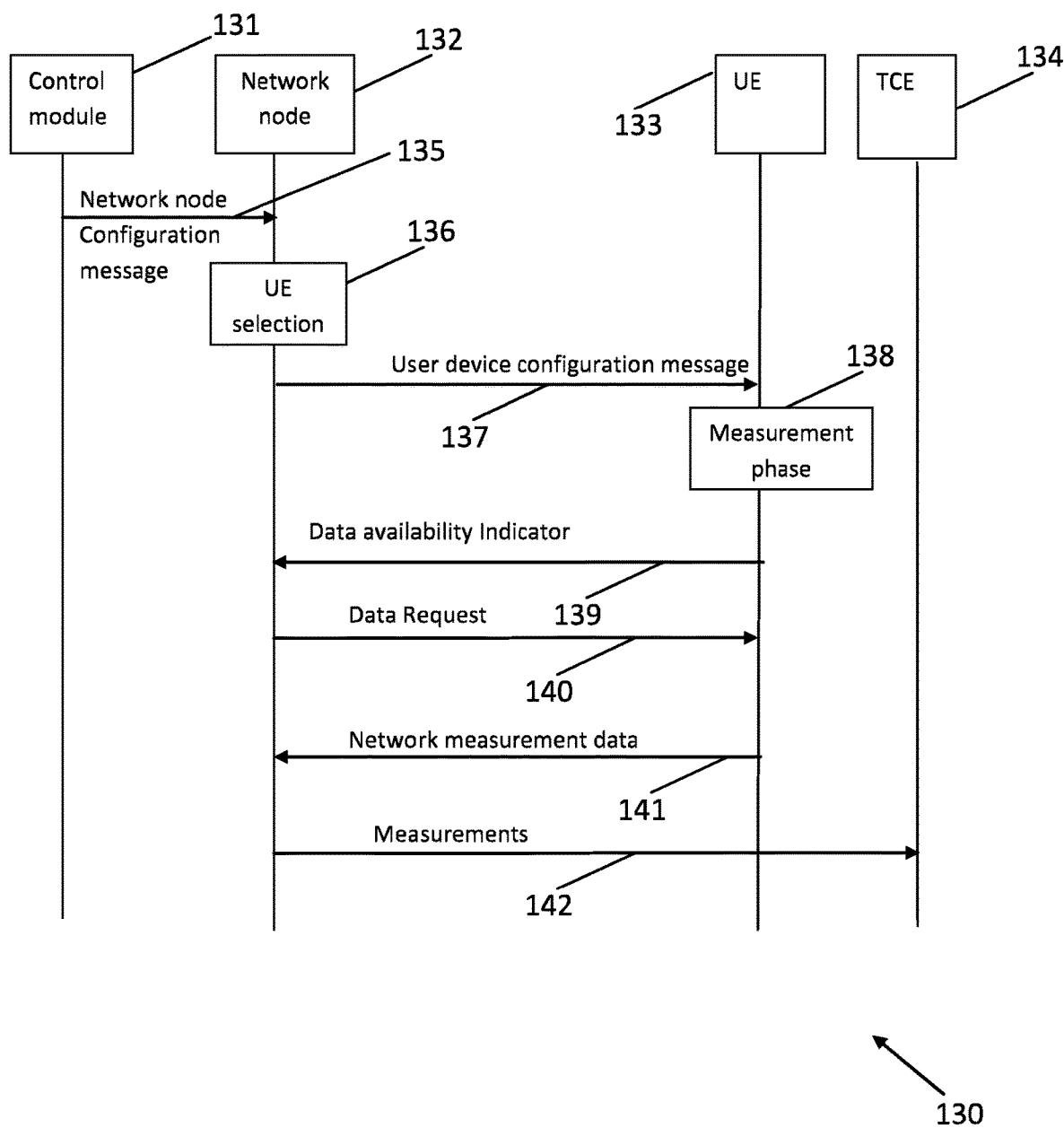

FIG. 12 shows a message sequence, indicated generally by the reference numeral 130, in accordance with example embodiments. The message sequence is an example implementation of the algorithm 60 and combines features of the message sequences 80, 90, 110 and 120 described above.

The message sequence 130 shows messages between a control module 131, a network node 132 (e.g. NG-RAN node), a UE 133 and a TCE 134.

The control module 131 sends a network node configuration message 135 to the network node 132 (thereby implementing the operation 61 of the algorithm 60 described above). In response, the network node 132 performs UE selection 136 (operation 62 of the algorithm 60) and sends a user device MDT configuration message 137 to the selected UE or UEs (only one UE 133 being shown in FIG. 12), thereby implementing the operation 63 of the algorithm 60 described above.

In response to the configuration message 137, the UE 133 enters a measurement phase 138 and, eventually, network MDT measurement data is provided to the network node 132 in a message 141 (e.g. UEInformationResponse IE).

In an example embodiment, a data availability indicator message 139 is sent by the UE 133 to the network node 132, in response to which a data request 140 (e.g. UEInformationRequest) is sent to the UE (see the messages 98 to 102 described above).

The message 141 may be provided to the network node 132 in response to the data request 140. Alternatively, the messages 139 and 140 may be omitted, with the message 141 being provided on completion (or as part of) the measurement phase 138 (e.g. Immediate MDT). Whenever the message 141 is sent, reception of the message 141 at the network node 132 implements the operation 64 of the algorithm 60 described above.

On receipt of the network measurement data in the message 141, measurement data are provided to the TCE 135 in the message 142 (thereby implementing the operation 65 of the operation 60 described above). Measurement data can be sent through measurement reports or measurement records comprising information for one or more CAG IDs. Measurement data containing CAG ID indication can alternatively be streamed to the TCE.

A number of variants of the algorithm 130 are possible, particularly in the event of a UE being configured for multiple CAG IDs. For example, the data request 140 may be sent after availability of data for all configured CAG IDs is indicated (e.g. in a message 139) or a data request may be sent even if MDT data availability is indicated only for some of the configured CAGs. Data requests may, for example, be sent per CAG ID.

A number of embodiments described above are related to area-based MDT measurements. These may be under the control of an NG-RAN OAM server (such as the server 71). This is not essential to all embodiments. For example, a number of signalling-based MDT algorithms can be provided. Such algorithms may be controlled by a 5G core network.

Figure 13:
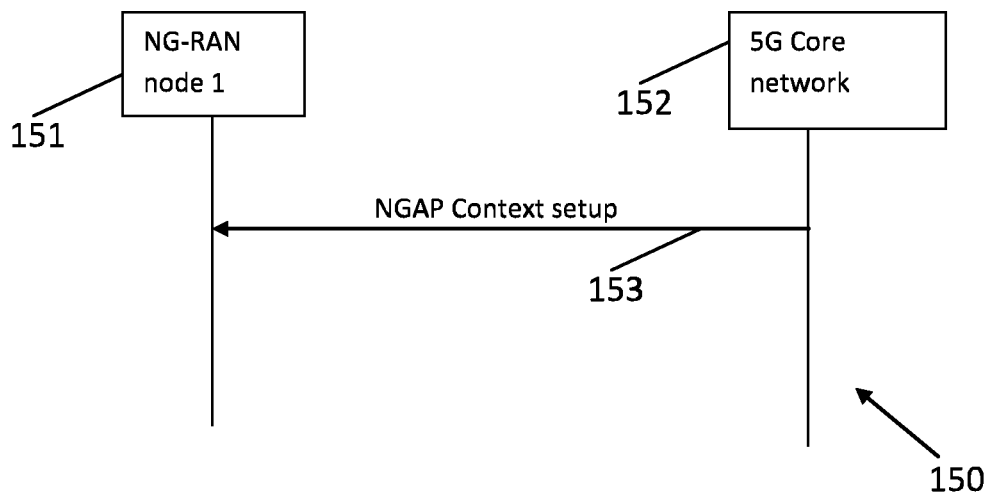

FIG. 13 shows a message sequence, indicated generally by the reference numeral 150, in accordance with example embodiments. The message sequence 150 shows a message between an NG-RAN node 151 and a 5G core network 152. The message sequence 150 may implement a signalling-based MDT algorithm.

The message sequence 150 comprises an NG Application Protocol (NGAP) initial context creation/modification message 153 being sent from the 5G Core network (5GC) 152 to the NG-RAN node 151. The message configures the NG-RAN node 151 with MDT measurements for a relevant UE with configuration parameters associated with one or more CAG IDs corresponding to the relevant UE. It should be noted that in the message sequence 150, the relevant UE(s) is/are identified (regardless of the location of the devices). Hence, the term used is "signalling-based" rather than "area-based" MDT.

The configuration parameters in the MDT configuration of the NGAP Initial Context Setup message 153 can be set on a per CAG ID basis. In case of Logged MDT, these configuration parameters may, for example, comprise area scope, periodicity of reporting, expiration timer, log duration, etc. for RSRP and RSRQ measurements. In case of Immediate MDT, the configuration parameters may, for example, comprise configuration parameters for measurements such as RSRP, RSRQ, power headroom, received interference power, data volume measurement, scheduled IP throughput, Packet Delay, Packet Loss Rate, RSSI, RTT and their respective measurement collecting triggers.

Figure 14:
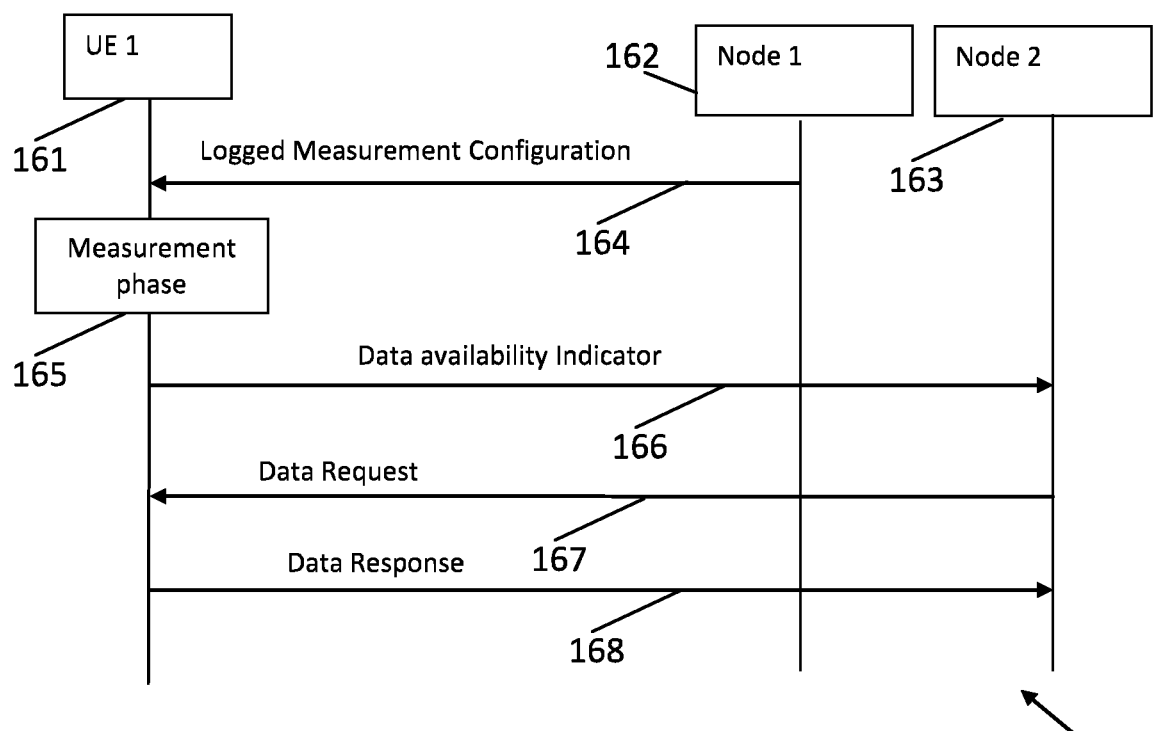

FIG. 14 shows a message sequence, indicated generally by the reference numeral 160, in accordance with example embodiments. The message sequence 160 shows messages between a user equipment 161, a first network node 162 and a second network node 163. The message sequence 160 may implement a signalling-based MDT algorithm. The network nodes 162 and 163 may have been initialised by a 5G core network, such as the core network 152 described above.

In a signalling-based logged MDT algorithm, an NG-RAN node (e.g. the first network node 162 as shown in FIG. 14) configures the UE 161 with a Logged Measurement Configuration message 164, if its serving CAG ID is part of the configured CAG IDs configured in the NG-RAN node or if there is a match between the UE Allowed CAG ID list at the UE (e.g. CAGs that the UE has access to) and the configured CAG IDs in the NG-RAN node.

The Logged Measurement Configuration message 164 includes one or more sets of configuration parameters, each associated with one or more CAG IDs for which the UE 161 should log and report measurements. This means that the configuration parameters in the RRC configure request can be set on a per CAG ID basis e.g. list of measurements, area scope, periodicity of reporting, expiration timer, log duration, etc.

The message sequence 160 shows an example where different area scope and measurements have been configured depending on the CAG ID involved. For example, message 164 is for measurement of CAG1 (area 1, measurement 1) and CAG2 (area2, measurement 2).

Once a measurement phase 165 is complete, the UE 161 signals the availability of the configured reports in a data availability indicator 166. As said the periodicity of the reports can be different on a per CAG ID basis, even for CAG IDs which have been configured in the same RRC configuration request.

The NG-RAN node can pull MDT reports from the UE by sending a data request message 167 (e.g., a UE Information Request IE), in response to which a data response 168 (e.g., a UEInformationResponse) is provided. The NG-RAN node may also report its own measurements related to the configured CAG IDs in same or different reports. The UE may report to the same NG-RAN node (e.g. node 162) which triggered the request or a different one (e.g. node 163 or some other node, not shown). (In the message sequence 160, for example, the UE reports to the second network node 163, although the original request was received from the first network node 162).

The message sequence 160 shows a Logged MDT arrangement. Of course, the message sequence 160 could be modified so that an Immediate MDT arrangement were provided (as discussed above with reference to FIG. 10).

On receipt of the relevant network measurement data from the UE (e.g. as part of a logged MDT embodiment or as part of an Immediate MDT embodiment), the relevant network node may report the data, for example to a trace collection entity (TCE), as described in detail above. The periodicity or trigger conditions to TCE may be CAG ID dependent (e.g. even if two CAG IDs had been configured together, their reporting periodicity to TCE can differ). Moreover, there may be potentially more than one TCE to send the NG-RAN reports i.e. it may be possible to dedicate some TCE to some CAG ID (s) or to some S-NSSAI(s).

Figure 15:
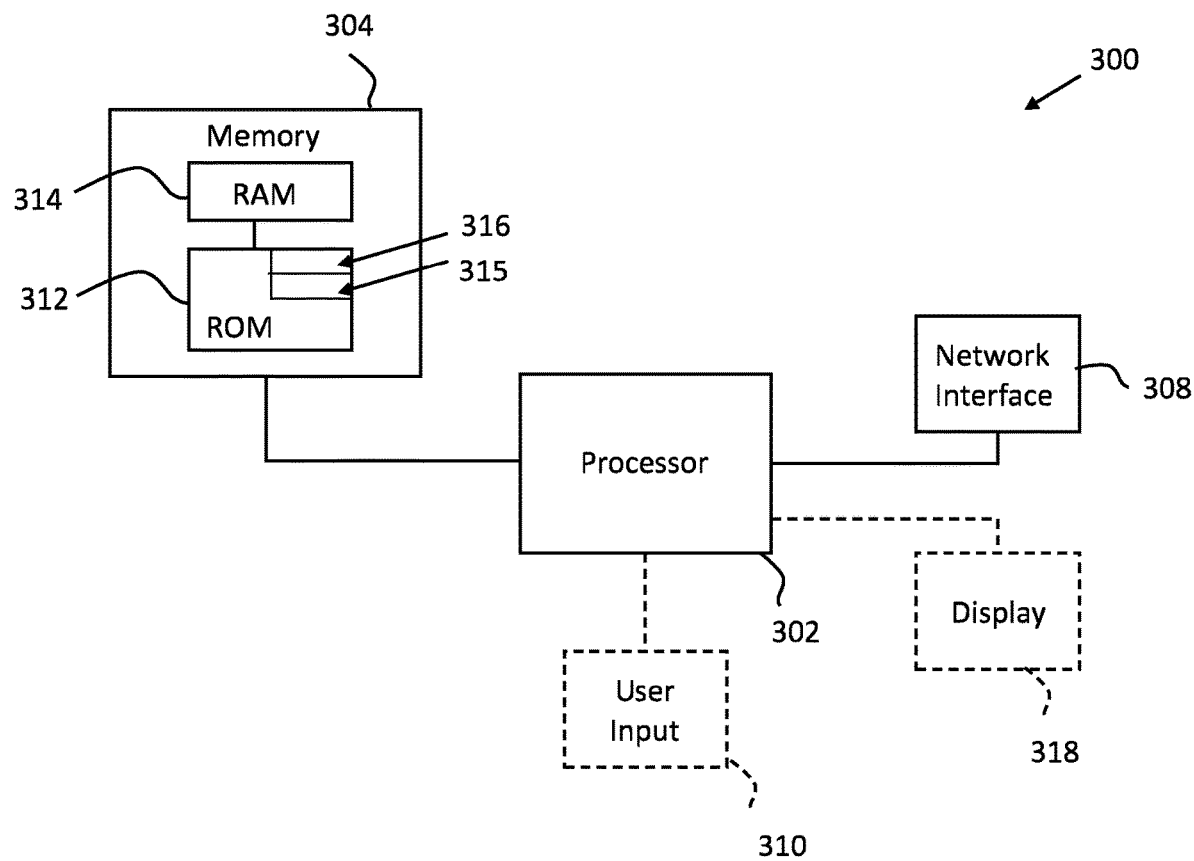
FIG. 15 is a block diagram of components of a system in accordance with an example embodiment.

For completeness, FIG. 15 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 50, 60, 70, 80, 90, 110, 120, 130 and 150 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 16A:
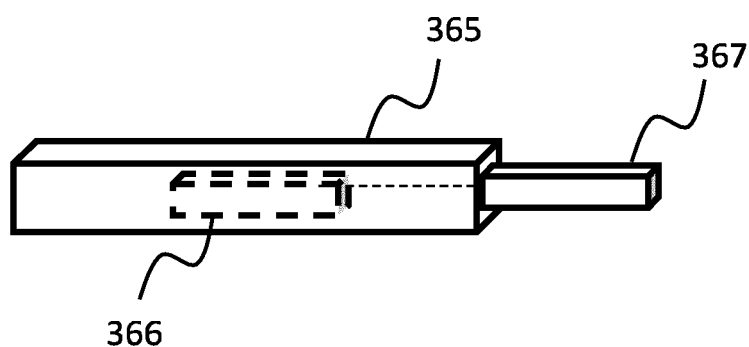
FIGS. 16A and 16B show tangible media, respectively a removable non-volatile memory unit and a Compact Disc (CD) storing computer-readable code which when run by a computer perform operations according to example embodiments.
Figure 16B:
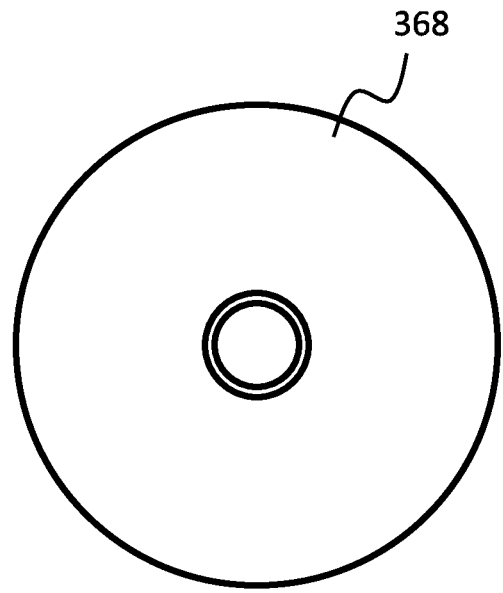

FIGS. 16A and 16B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 5 to 14 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A network node, comprising:
   at least one processor; and
   at least one memory including computer program code, the at least one memory and the computer program code configured to, with the at least one processor, cause the network node to perform at least the following:
   receive, one or more network node configuration messages from a control module, wherein each network node configuration message relates to network measurement of one or more restricted access resources for one or more groups of users of a public land mobile network, wherein the one or more restricted access resources are indicated within the network node configuration messages with one or more restricted access resource indicators;
   select one or more user devices from the one or more groups of users based on their respective correspondences to the one or more restricted access resource indicators; and
   send one or more user device configuration messages to the one or more selected user devices, respectively, wherein each user device configuration message includes a request to measure the one or more restricted access resources that are indicated to be performed by the one or more selected user devices, respectively.

2. The network node as claimed in claim 1, wherein the request to measure restricted access resources is a request for the selected devices to measure in RRC idle state, and wherein the user device configuration message further includes one or more resource indicators, wherein the one or more resource indicators identify the one or more restricted access resources to be measured by the selected UEs in RRC idle state.

3. The network node as claimed in claim 2, wherein the selecting of said one or more selected user devices is based on an identification of a particular user device within a message received from a 5G core network module.

4. The network node as claimed in claim 1, wherein the at least one memory and the computer program code are configured to, with the at least one processor, cause the network node to further perform at least: receiving network measurement data for at least one of the one or more restricted access resources from at least one of the one or more selected user devices.

5. The network node as claimed in claim 4, wherein the at least one memory and the computer program code are configured to, with the at least one processor, cause the network node to further perform at least: sending one or more measurement reports based on the network measurement data to one or more trace collection entities.

6. The network node as claimed in claim 5, wherein:
the one or more measurement reports are combined into measurement data associated with a non-public network associated with the public land mobile network; or
the one or more measurement reports are combined into measurement data associated with one or more slices of the public land mobile network.

7. The network node as claimed in claim 1, wherein the network measurement is related to minimization of drive test measurements.

8. The network node as claimed in claim 1, wherein the control module comprises an NG-RAN Operation Administration and Management module.

9. The network node as claimed in claim 1, wherein the control module is a 5G core network module.

10. The network node as claimed in claim 1, wherein the at least one memory and the computer program code are configured to, with the at least one processor, cause the network node to further perform at least: receiving one or more data availability indication messages from one or more of said selected user devices, wherein each data availability message indicates that network measurement data associated with the respective user device are available.

11. The network node as claimed in claim 1, wherein the at least one memory and the computer program code are configured to, with the at least one processor, cause the network node to further perform at least: sending a data request to one of said selected user devices requesting said network measurement data when the user equipment has access to the at least one restricted access resource and/or is able to determine network measurement data for the at least one restricted access resource.

12. The network node as claimed in claim 1, further caused to perform one or more of:
receiving the one or more network node configuration messages from the control module with the resource indicators,
selecting the one or more user devices based on their belonging to the one or more groups,
identifying restricted access resources which the selected users are able to measure based on the received resource indicators,
sending the one or more user device configuration messages to the one or more selected user devices including the identified restricted access resources to measure,
receiving the measurements of the restricted access resources from the selected UEs,
sending the measurements from the selected devices to the control module.

13. A user device, comprising:
at least one processor; and
at least one memory including computer program code, the at least one memory and the computer program code configured to, with the at least one processor, cause the user device to perform at least the following:
receiving, from a network node by which the user device is selected, one or more user device configuration messages, wherein each user device configuration message includes one or more resource indicators and one or more parameters to be measured, wherein the one or more resource indicators identify one or more restricted access resources for one or more groups of users selected by the network node, and the one or more groups of users being of a public land mobile network;
determining network measurement data related to the one or more parameters of the one or more restricted access resources corresponding to the one or more resource indicators when the user device has access to the one or more restricted access resources or is able to determine the network measurement data for the one or more restricted access resources; and
storing the determined network measurement data for later retrieval.

14. The user device as claimed in claim 13, wherein the at least one memory and the computer program code are configured to, with the at least one processor, cause the user device to further perform at least: sending a data availability indication message to a receiving network node indicating that the network measurement data associated with the respective restricted access resource are available.

15. The user device as claimed in claim 13, wherein the at least one memory and the computer program code are configured to, with the at least one processor, cause the user device to further perform at least: sending the determined network measurement data to a receiving network node.

16. The user device as claimed in claim 13, wherein the group of users allowed to access the one or more restricted access resources belongs to one tenant associated with the public land mobile network.

17. The user device as claimed in claim 13, wherein the group of users allowed to access the one or more restricted access resources correspond to one or more Closed Access Group(s) of a non-public network associated to the public land mobile network, and the one or more resource indicators correspond to one or more CAG Identifier(s).

18. A method comprising:
receiving from a network node by which a user device is selected, one or more user device configuration messages, wherein each user device configuration message includes one or more resource indicators and one or more parameters to be measured, wherein the one or more resource indicators identify one or more restricted access resources on for one or more groups of users selected by the network node, the one or more groups of users being of a public land mobile network; and
determining network measurement data related to the one or more network parameters of the one or more restricted access resources corresponding to the one or more resource indicators, when the user device has access to the one or more restricted access resources or is able to determine the network measurement data for the one or more restricted access resource(s); and
storing the determined network measurement data for later retrieval.

* * * * *